(12) United States Patent
Chen et al.

(10) Patent No.: US 8,516,949 B2
(45) Date of Patent: Aug. 27, 2013

(54) TEA POT WITH CHECK VALVE

(76) Inventors: Han Tsung Chen, Taichung (TW); Wei Fu Chen, Taichung (TW)

( * ) Notice: Subject to any disclaimer, the term of this patent is extended or adjusted under 35 U.S.C. 154(b) by 516 days.

(21) Appl. No.: 12/848,234

(22) Filed: Aug. 2, 2010

(65) Prior Publication Data
US 2012/0024162 A1    Feb. 2, 2012

(51) Int. Cl.
*A47J 31/44* (2006.01)
*A47J 31/02* (2006.01)
*A47G 19/14* (2006.01)
*A47G 19/16* (2006.01)

(52) U.S. Cl.
CPC .............. *A47J 31/02* (2013.01); *A47G 19/14* (2013.01); *A47G 19/16* (2013.01)
USPC .................................. 99/316; 99/299; 99/300

(58) Field of Classification Search
USPC ............... 99/275, 295, 279, 297, 322, 323, 99/316–319, 495, 494, 484; 206/219, 222; 210/474–479, 181, 282; 220/23.8, 912, 712, 220/713, 718; 221/312 C; 426/77, 110, 426/426/78, 86, 112, 134, 115, 120, 82–84, 426/6, 432, 433, 435
See application file for complete search history.

(56) References Cited

U.S. PATENT DOCUMENTS

| | | | | |
|---|---|---|---|---|
| 5,586,484 A | * | 12/1996 | Piazza | 99/287 |
| 5,832,809 A | * | 11/1998 | Gras | 99/299 |
| 6,481,337 B1 | * | 11/2002 | Guu | 99/285 |

* cited by examiner

*Primary Examiner* — Henry Yuen
*Assistant Examiner* — Thien S Tran

(57) ABSTRACT

A tea pot includes an upper container assembly comprising a releasable top, an open bottom, a beverage chamber, and a funnel in the beverage chamber; a check valve comprising a cylindrical seat comprising a bossed hole having a conical top surface, an opening spaced from the hole and being sealingly aligned with a stem of the funnel, and guide slots on an annular surface of the seat; a conical valve unit comprising a stepped-diameter tunnel, the valve unit being seated upon the seat; and a sliding assembly comprising a body, periphery tabs slidably received in the guide slots, and a top shaft including grooves, and a cylindrical top projection fasten in the tunnel wherein the shaft is slidably inserted into the hole in an assembled state; and a lower container assembly comprising releasable top and bottom, a lower ingredient chamber, and an intermediate strainer.

1 Claim, 6 Drawing Sheets

TEA POT WITH CHECK VALVE

BACKGROUND OF THE INVENTION

1. Field of Invention

The invention relates to vessels for steeping tea leaves in hot water and more particularly to a tea pot having a check valve.

2. Description of Related Art

Typically, tea leaves are put into a vessel and then hot water is added or vice versa. After a few minutes, a fragrant tea is made. However, a person may often carelessly drink the extracted tea leaves. It is found that the less the hot water, the more the extracted tea leaves being drunk by a person. Moreover, the flavor of tea infusion is consumed quickly.

A typical tea steeping device comprises a cup comprising a cone shape inclined bottom, a through hole in the bottom center, a flange around the periphery of the cup bottom, a plurality of symmetric vertical holes formed on the surface of the flange, and a plurality of paired and symmetric foot plates being extended from the flange; a filter member in the cup bottom; a disk having a ring with a diameter slightly less than the flange, the ring having a plurality of symmetric posts so as to insert into the respective holes of the flange so that the cup and the disk are capable of lifting or lowering a rod in the ring center, and holes through the foot plates on the disk adjacent the ring; a water stopper comprising a stop pad at the hole on the cup bottom, and a metal ball on the hole, wherein the stop pad facing the top of the ball has a slot so as to be spaced from and formed with a thinner stop ring; wherein when the cup is placed on a flat surface, the disk slides downwards along the hole and the water stopper is released so that the water stopper will apply force against the hole to block exit.

However, the conventional tea steeping device suffers from a number of disadvantages. For example, its components are complicated. Also, it is not durable. Moreover, its manufacturing cost is relatively high. Thus, the need for improvement still exists.

SUMMARY OF THE INVENTION

It is therefore one object of the invention to provide a tea pot comprising an upper container assembly comprising a releasable top, an open bottom, a beverage chamber occupying a predetermined portion of space of the upper container assembly, and a funnel in the beverage chamber, the funnel extending from top of the beverage chamber to bottom thereof; a check valve comprising a cylindrical seat comprising a central, axial, bossed hole having a conical top surface, an opening spaced from the hole and being sealingly aligned with a stem of the funnel, and a plurality of equally spaced, rectangular, vertically directed guide slots on an annular surface of the seat; a plastic, conical valve unit comprising a central, axial tunnel having a stepped-diameter surface, the valve unit being seated upon the matingly shaped top surface of the seat; and a sliding assembly comprising a body, a plurality of equally spaced, rectangular tabs on an annular outer surface of the body, the tabs being slidably received in the guide slots, and a top shaft including a plurality of equally spaced grooves on a surface with an L-shaped protrusion formed between any two adjacent grooves, and a cylindrical top projection shaped to matingly fasten in the tunnel wherein the shaft is slidably inserted into the hole of the seat with the protrusions engaging with underside of the seat in an assembled state; and a lower container assembly comprising a top releasably secured to the bottom of the upper container assembly, a releasable bottom cap, a lower ingredient chamber, and an intermediate strainer for separating the ingredient chamber from the check valve which is positioned above the ingredient chamber in the lower container assembly, wherein in response to inverting the tea pot, opening the bottom cap of the lower container assembly, placing tea leaves in the ingredient chamber, securing the bottom cap to the lower container assembly, inverting the tea pot, opening the top of the upper container assembly, and pouring hot water into the ingredient chamber via the funnel, the opening, and the strainer, the tea leaves are soaked for extraction; wherein liquid level in the ingredient chamber rises to move the sliding assembly upward as the tabs move upward along the guide slots until being stopped with the upward moving shaft disengaging the valve unit from the seat to open the hole; wherein brewed beverage in the ingredient chamber flows into the beverage chamber for accumulation via the grooves in the hole; and wherein after a first predetermined period of time in response to closing the upper container assembly, inverting the tea pot, elapsing a second predetermined period of time, and inverting the tea pot, the shaft moves downward to block the hole due to weights of the beverage in the beverage chamber, the sliding assembly, and the valve unit.

The above and other objects, features and advantages of the invention will become apparent from the following detailed description taken with the accompanying drawings.

DETAILED DESCRIPTION OF THE INVENTION

Figure 1:
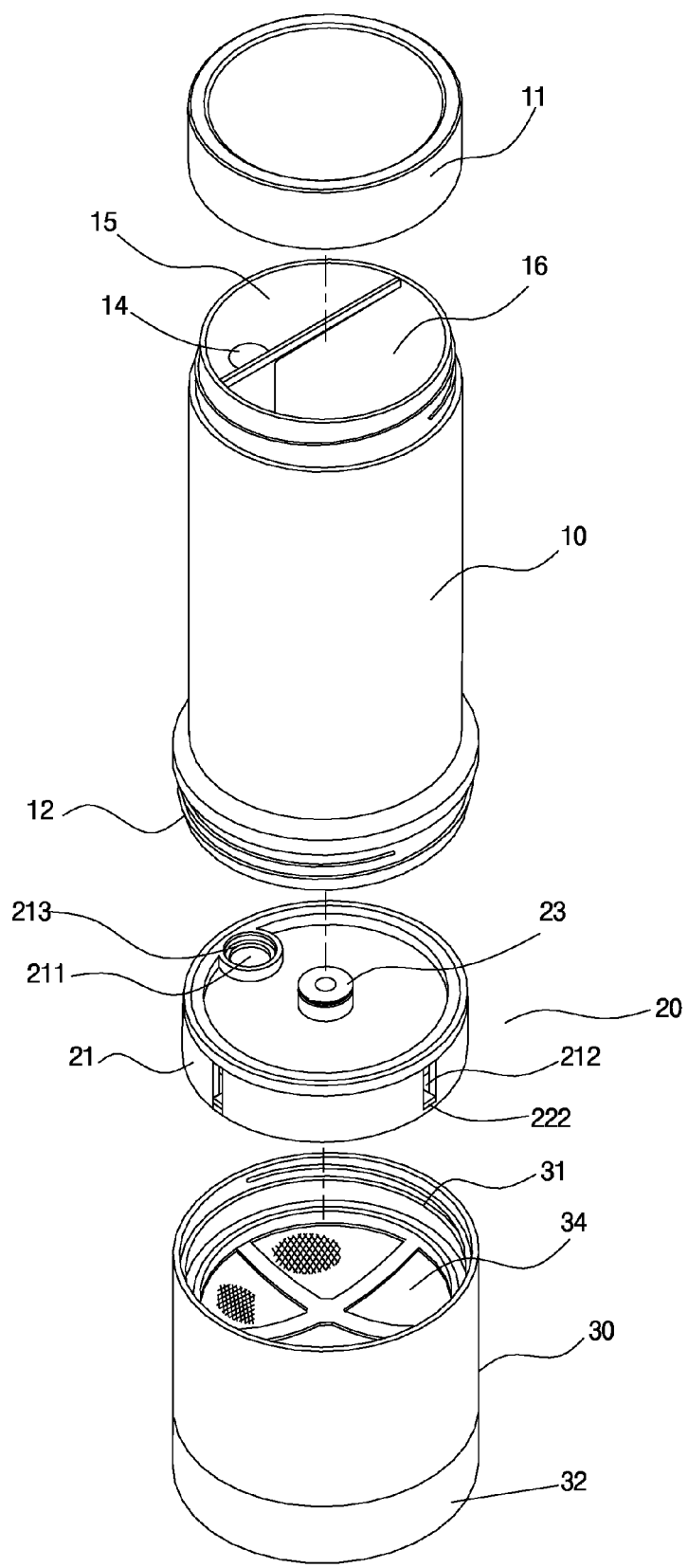
FIG. 1 is an exploded view of a tea pot according to the invention.
Figure 2:
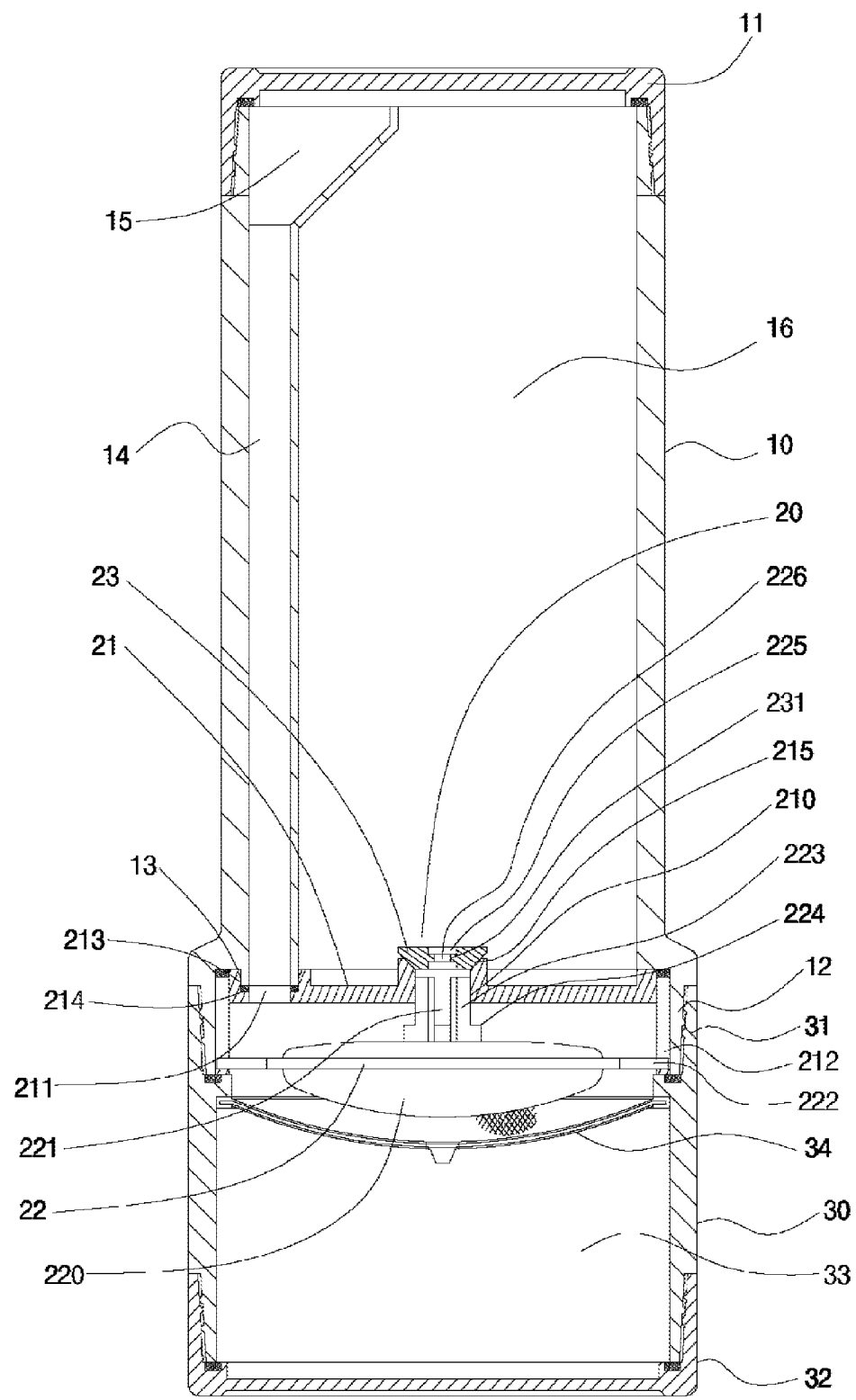
FIG. 2 is a longitudinal sectional view of the assembled tea pot.
Figure 3:
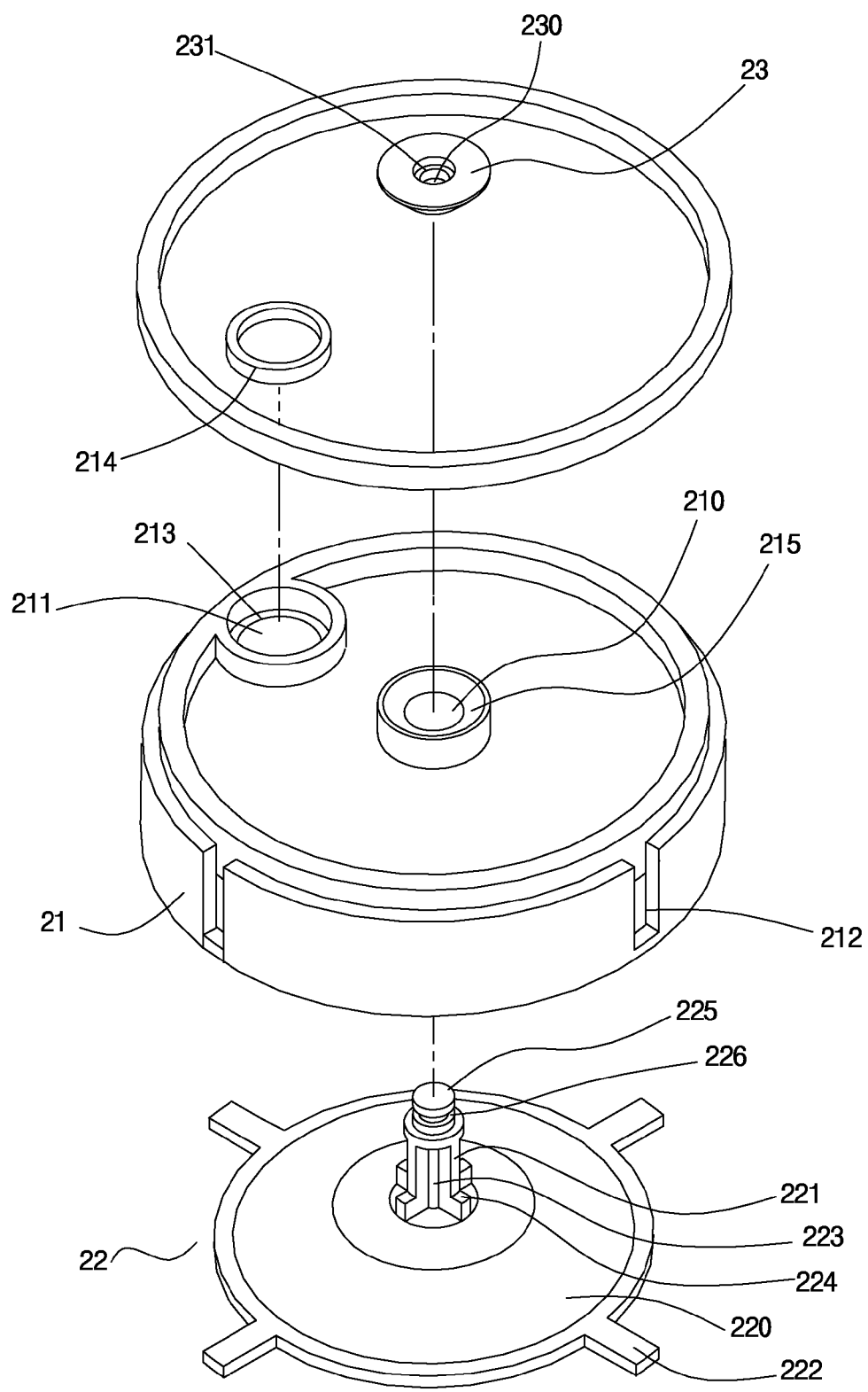
FIG. 3 is an exploded view of the check valve.

Referring to FIGS. 1 to 6, a tea pot in accordance with the invention comprises the following components as discussed in detail below.

A cylindrical upper container assembly 10 comprises an externally threaded lower portion 12, a top cap 11 having internal threads threadedly secured to an externally threaded upper portion of the container assembly 10, an open bottom, a beverage chamber 16 occupying a large portion of an internal space of the upper container assembly 10, a top funnel 15 spaced from the beverage chamber 16 by a diaphragm wall (not numbered), and an inlet channel 14 extending from bottom of the funnel 15 to the bottom, and a mounting member 13 projecting out of the bottom of the inlet channel 14.

A check valve 20 comprises a shallow, cylindrical seat 21, a sliding assembly 22, and a valve unit 23. The seat 21 comprises a central, axial, bossed hole 210 having a somewhat conically-tapered top surface 215, a circular opening 211 integrally formed with an annular flanged top edge (not numbered), an annular shoulder 213 in the opening 211, a ring shaped gasket 214 seated upon the shoulder 213, and a plurality of (four) equally spaced, rectangular, vertically directed guide slots 212 on an annular surface of the seat 21. An annular gasket (not numbered) is sealingly put on an annular top shoulder (not numbered) of the seat 21. The plastic valve unit 23 is somewhat conically-tapered and comprises a central, axial tunnel 230 having a stepped-diameter surface 231. The valve unit 23 is seated upon the matingly shaped top surface 215 with its bottom flush with the annular joining line of the top surface 215 and the hole 210. The mounting member 13 is matingly seated upon the gasket 214 in the opening 211 so that the inlet channel 14 is aligned with the opening 211.

The sliding assembly 22 comprises a hollow body 220 having convex top and bottom surfaces, a plurality of (four) equally spaced, rectangular tabs 222 on an annular outer surface of the hollow body 220, and a top shaft 221 including a plurality of (four) equally spaced grooves 223 on the surface with an L-shaped protrusion 224 formed between any two adjacent grooves 223 (i.e., there are four protrusions 224), a cylindrical top projection 225 having an annular trough 226 thereon. The tabs 222 are slidably received in the guide slots 212. The shaft 221 is slidably inserted into the hole 210 with the transverse portions of the protrusions 224 engaged with the underside of the seat 21 in an assembled state. The projection 225 inserts into the tunnel 230 with the trough 226 matingly engaged with the protruded portion of the stepped-diameter surface 231. As a result, the seat 21, the sliding assembly 22, and the valve unit 23 are assembled in which the sliding assembly 22 and the valve unit 23 are secured together.

A cylindrical lower container assembly 30 comprises an internally threaded upper portion 31, a releasable bottom cap 32, a lower ingredient chamber 33, and an intermediate, inverted umbrella top shaped strainer 34 for separating the ingredient chamber 33 from the upper portion 31. The check valve 20 is seated upon an inward extending rim (not numbered) just above the strainer 34. Further, the upper portion 31 is threadedly secured to the lower portion 12 so as to secure the lower and upper container assemblies 30, 10 together with the check valve 20 securely disposed above the strainer 34.

Figure 4:
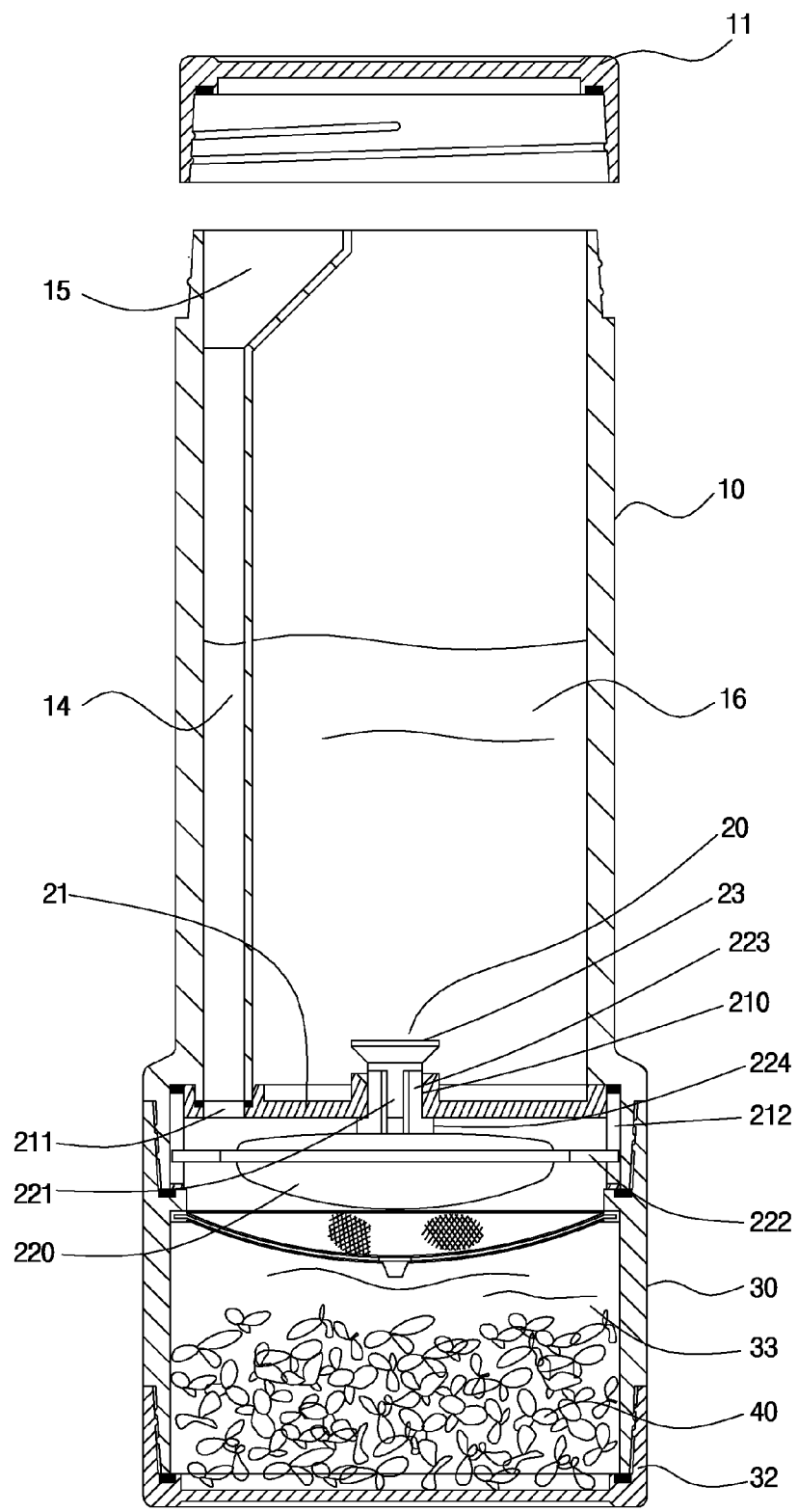
FIG. 4 is a view similar to FIG. 2 showing a steeping state of the tea pot.
Figure 5:
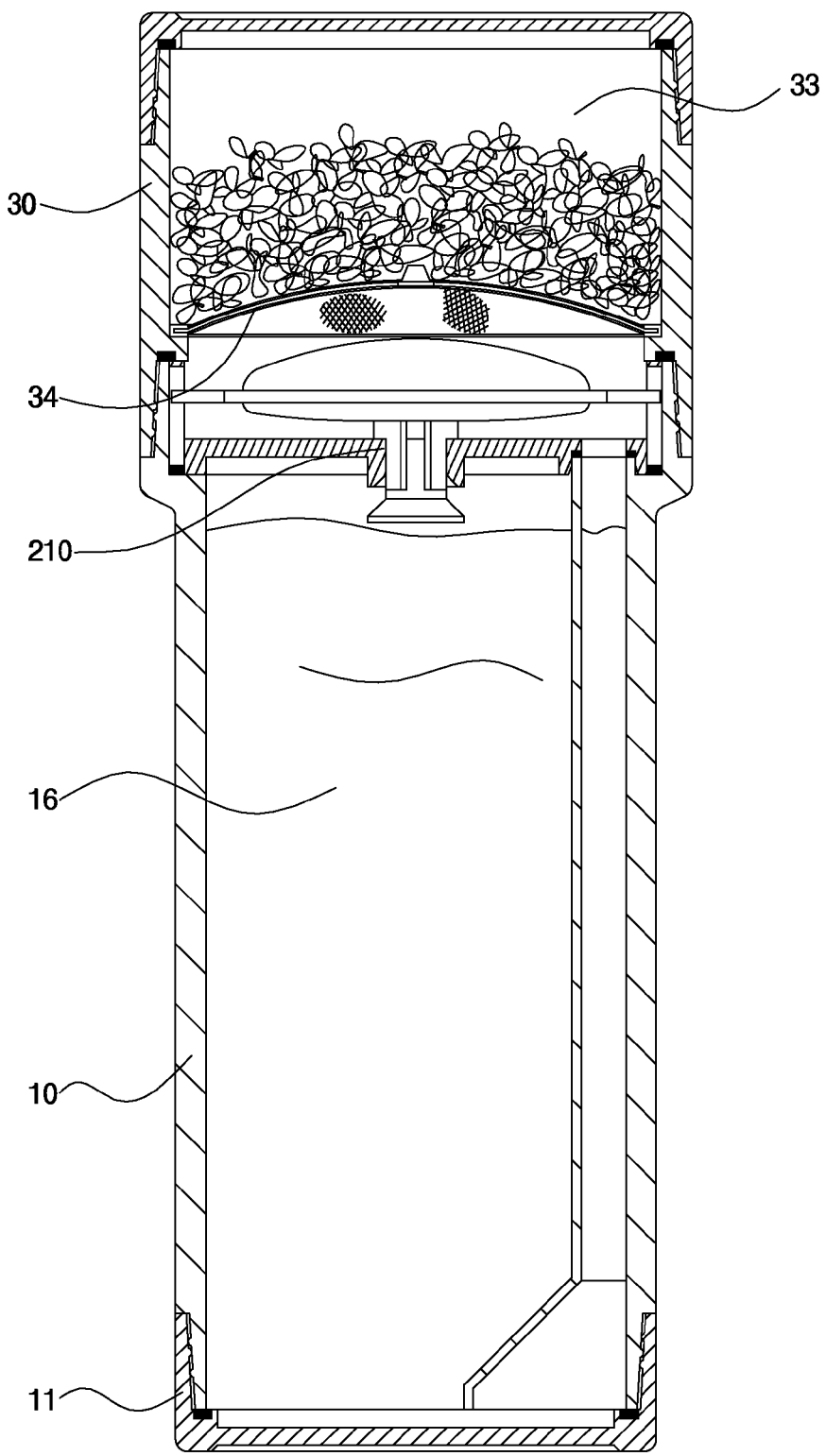
FIG. 5 is a longitudinal sectional view of the inverted tea pot after finishing the steeping.
Figure 6:
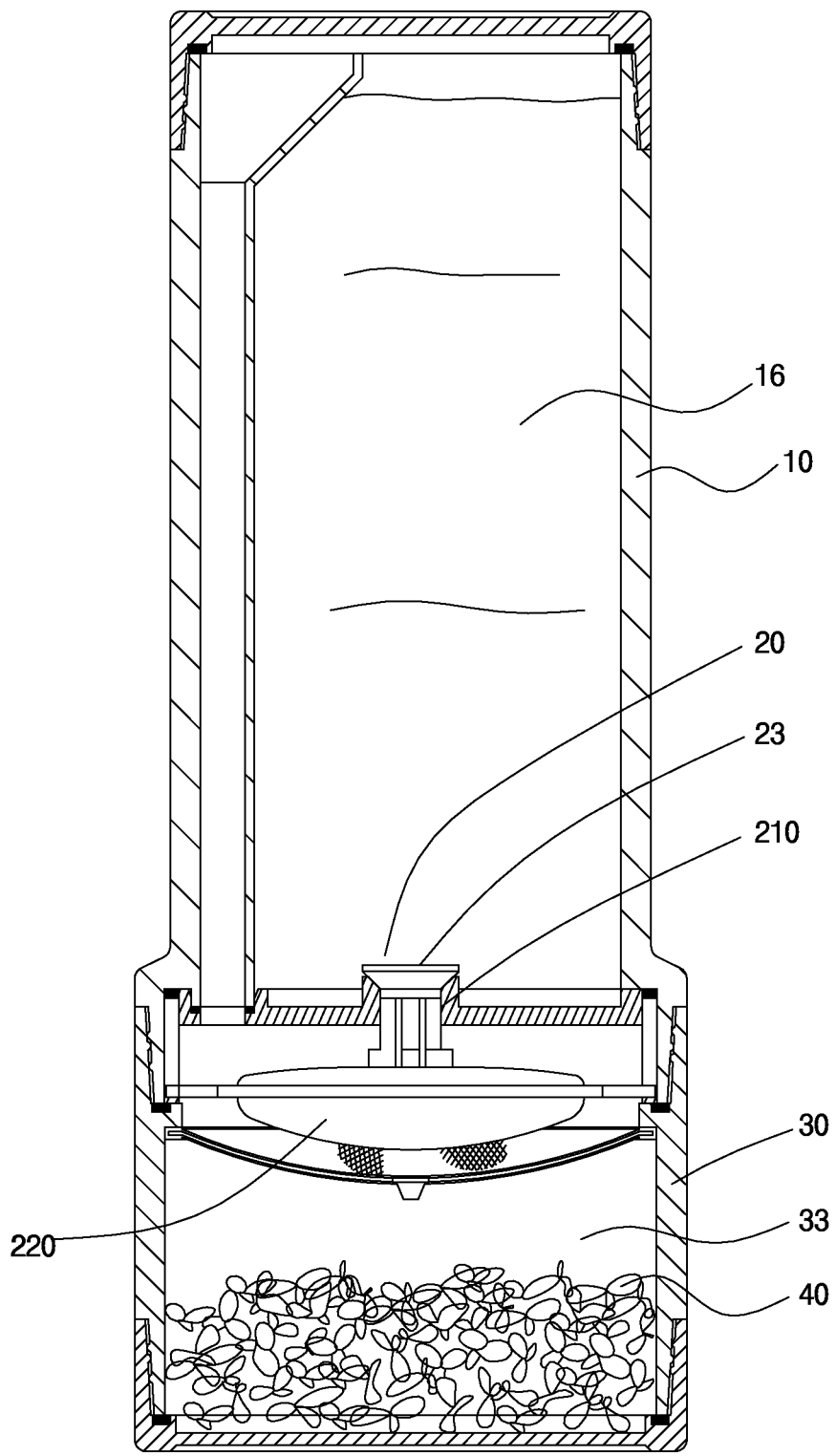
FIG. 6 is a longitudinal sectional view of the tea pot with the brewed tea to be ready to serve.

A steeping operation of the tea pot is described in detailed below by referring to FIGS. 4-6. Remove the bottom cap 32. Invert the lower container assembly 30 and place tea leaves 40 on the strainer 34 (i.e., in the ingredient chamber 33). Secure the bottom cap 32 to the lower container assembly 30. Assemble the lower container assembly 30, the check valve 20, and the upper container assembly 10. Open the upper container assembly 10 by unfastening the top cap 11. Pour hot water into the ingredient chamber 33 via the funnel 15, the inlet channel 14, the opening 211, and the strainer 34. The tea leaves are thus wetted and saturated in the ingredient chamber 33 with beverage being brewed in the ingredient chamber 33. Liquid level in the ingredient chamber 33 may rise as hot water continues to pour. The liquid may enter the check valve 20 via the strainer 34. Thus, the sliding assembly 22 may move upward as the tabs 222 moves upward along the guide slots 212 until being stopped. And in turn, the blocked hole 210 is open as the shaft 221 moves upward to disengage the valve unit 23 from the seat 21 (see FIG. 4). The brewed beverage thus flows into the beverage chamber 16 via the grooves 223 in the hole 210. An individual may close the upper container assembly 10 by threadedly securing the top cap 11 to the externally threaded upper portion of the upper container assembly 10 after a desired amount of hot water has been poured in the tea pot and after the tea leaves have been sufficiently extracted (e.g., five to seven minutes of steeping time). Thereafter, invert the tea pot (see FIG. 5). The brewed beverage in the ingredient chamber 33 still continues to flow into the beverage chamber 16 for accumulation via the grooves 223. The individual may quickly invert the tea pot again after a preset period of time (e.g., about three minutes) (see FIG. 6). Weights of the beverage in the beverage chamber 16, the sliding assembly 22, and the valve unit 23 may quickly cause the shaft 221 to move downward until the hole 210 is blocked again (i.e., the check valve 20 being closed). The beverage in the beverage chamber 16 is prevented from flowing into the ingredient chamber 33 (i.e., blocking reverse flow). It is noted that only a minimum amount of beverage may flow from the beverage chamber 16 into the ingredient chamber 33 during the sudden inversion of the tea pot from FIG. 5 to FIG. 6. Hence, the individual may open the top cap 11 to drink the tea in the beverage chamber 16.

While the invention has been described in terms of preferred embodiments, those skilled in the art will recognize that the invention can be practiced with modifications within the spirit and scope of the appended claims.

What is claimed is:

1. A tea pot comprising:

an upper container assembly comprising a releasable top, an open bottom, a beverage chamber occupying a predetermined portion of space of the upper container assembly, and a funnel in the beverage chamber, the funnel extending from top of the beverage chamber to bottom thereof;

a check valve comprising a cylindrical seat comprising a central, axial, bossed hole having a conical top surface, an opening spaced from the central, axial, bossed hole and being sealingly aligned with a stem of the funnel, and a plurality of equally spaced, rectangular, vertically directed guide slots on an annular surface of the cylindrical seat; a plastic, conical valve unit comprising a central, axial, stepped-diameter tunnel, the valve unit being seated upon the matingly shaped conical top surface of the cylindrical seat; and a sliding assembly comprising a hollow body, a plurality of equally spaced, rectangular tabs on an annular outer surface of the hollow body, the tabs being slidably received in the guide slots, and a top shaft including a plurality of equally spaced, surficial grooves with an L-shaped protrusion formed between any two adjacent grooves, and a cylindrical top projection shaped to matingly fasten in the tunnel wherein the top shaft is slidably inserted into the central, axial, bossed hole of the cylindrical seat for blocking with the protrusions engaging with underside of the cylindrical seat; and a lower container assembly comprising a top releasably secured to the bottom of the upper container assembly, a releasable bottom cap, a lower ingredient chamber, and an intermediate strainer for separating the ingredient chamber from the check valve which is positioned above the ingredient chamber in the lower container assembly, wherein in response to inverting the tea pot, opening the bottom cap of the lower container assembly, placing tea leaves in the ingredient chamber, securing the bottom cap to the lower container assembly, inverting the tea pot, opening the top of the upper container assembly, and pouring hot water into the ingredient chamber via the funnel, the opening, and the strainer, the tea leaves are soaked for extraction;

wherein liquid level in the ingredient chamber rises to move the sliding assembly upward as the tabs move upward along the guide slots until being stopped with the upward moving the top shaft disengaging the valve unit from the cylindrical seat to open the central, axial, bossed hole;

wherein brewed beverage in the ingredient chamber flows into the beverage chamber for accumulation via the grooves in the central, axial, bossed hole; and wherein after a first predetermined period of time in response to closing the upper container assembly, inverting the tea pot, elapsing a second predetermined period of time, and inverting the tea pot, the top shaft moves downward to block the central, axial, bossed hole due to weights of the beverage in the beverage chamber, the sliding assembly, and the valve unit.

* * * * *